March 17, 1925. 1,529,654
V. H. HURT
TIRE CORE
Filed Feb. 10, 1922
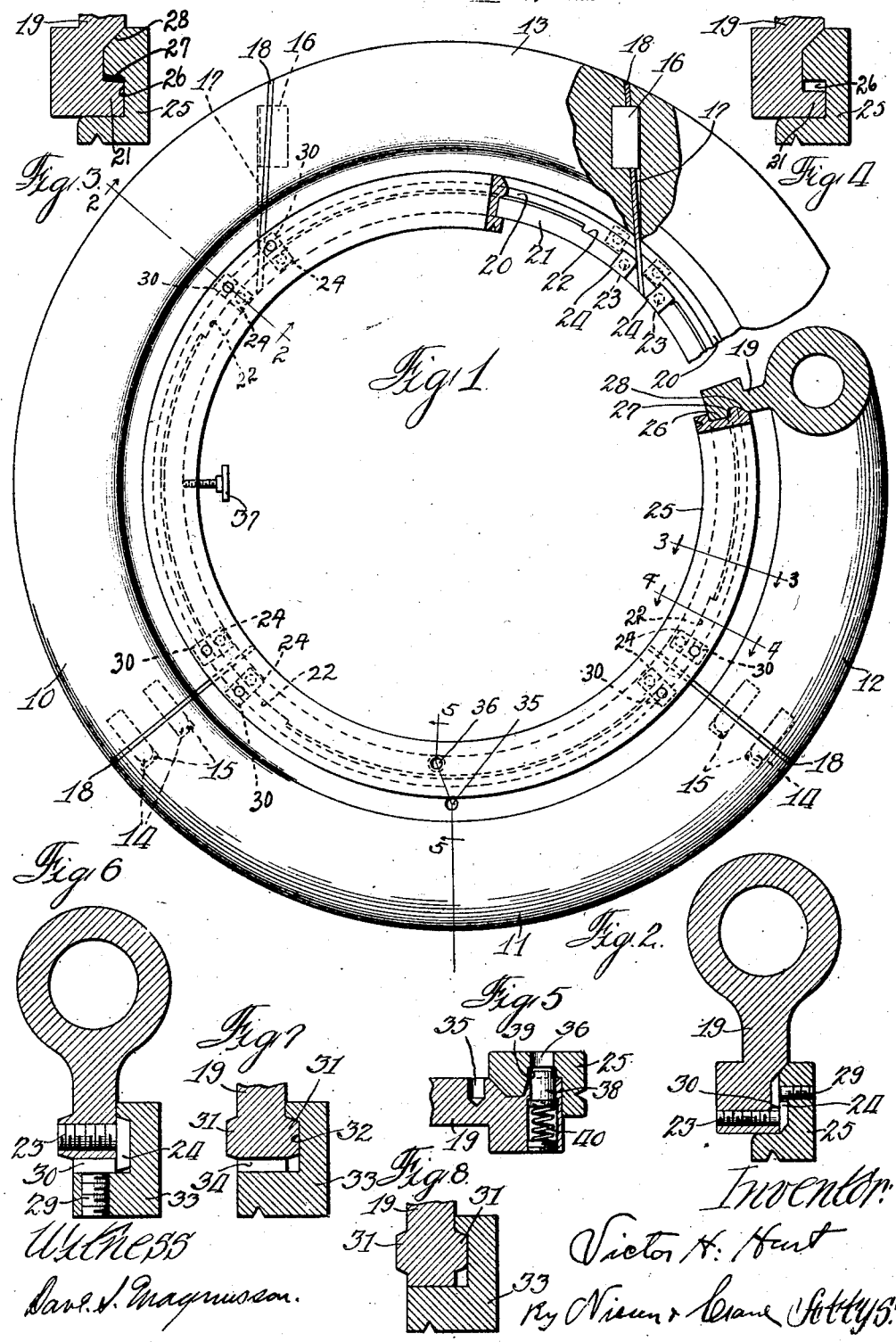

Patented Mar. 17, 1925.

1,529,654

UNITED STATES PATENT OFFICE.

VICTOR H. HURT, OF FORT MADISON, IOWA.

TIRE CORE.

Application filed February 10, 1922. Serial No. 535,437.

*To all whom it may concern:*

Be it known that I, VICTOR H. HURT, a citizen of the United States, residing at Fort Madison, in the county of Lee and State of Iowa, have invented certain new and useful Improvements in Tire Cores, of which the following is a specification.

My invention relates to tire cores for vehicle tires, and the like, and has for one of its objects the provision of simple and efficient means for securing the sections of a sectional tire core in operative position.

A further object is the provision of a device of this character which permits quick and easy adjustment of the sections into and out of operative condition.

Other objects will appear hereinafter.

An embodiment of my invention is indicated in the accompanying drawing forming a part of this specification, and in which—

Fig. 1 is a side view of a tire core embodying my invention and having portions broken away to expose underlying parts;

Fig. 2 is an enlarged section taken on line 2—2 of Fig. 1;

Figs. 3, 4 and 5 are enlarged fragmental sections taken on lines 3—3, 4—4, and 5—5, respectively, of Fig. 1;

Fig. 6 is a view similar to Fig. 2, but showing a different form of the connection; and Figs. 7 and 8 are views similar to Figs. 3 and 4, but showing the form of Fig. 6.

Referring more particularly to the drawing, I have indicated an annular tire core made up of four sections, 10, 11, 12 and 13.

These sections may be made up of any size or of any desired material, such as that now commonly in use. My invention relates particularly to the means for securing these sections together in operative condition.

Between the ends of sections 10 and 11 and 11 and 12 I provide one or more dowel pins 14 resting in a corresponding recess 15, as clearly indicated in Fig. 1. These dowel pins may be cylindrical or of any desired cross-section and are preferably arranged so as to prevent relative twisting movement between these parts.

Section 13 is preferably wedge-shaped and is usually the last part of the core placed in position and the first one to be taken out when the core is taken down. The section 13 is preferably provided with an elongated dowel 16 operating in a slot 17 at each end of said section 13. By providing the dowels relatively long with respect to their widths they serve to prevent relative twisting movements between sections 13 and 12 and sections 13 and 10. The slots 17 are preferably cut so that the dowel 16 can slide upwardly into its position, indicated in Fig. 1.

In making up the sections 10 to 13, inclusive, the core is usually formed in an annulus and then sawed apart to provide the four sections mentioned. In thus sawing the annulus, spaces are formed at the saw kerfs and in order to preserve the proper form of the core thin plates 18 are inserted in these saw kerfs and held against any of the sections desired by any desirable means.

The core, made up of sections 10 to 13, inclusive, has an inwardly extending web 19 in which is an annular slot 20 leaving an annular projection 21 around the inner periphery of the core. This projection 21 has portions 22 cut away adjacent the ends of said sections. Adjacent the cut-away portions 22 are studs or bolts 23 each having a head 24 extending into the cut-away portion 22, as clearly indicated in Fig. 1.

A ring 25 has an annular groove 26 formed therein substantially fitting the projection 21. The walls 27 and 28 of the groove 20 and the adjacent walls of the ring 25 are preferably tapered, as indicated in Fig. 1, so that should the sections 10 to 13, inclusive, not be exactly lined up, these tapering walls will bring them into alinement and all of the sections in annular form when the ring 25 is forced tightly against the web 19.

The ring 25 has a plurality of studs 29 corresponding in number and position to the studs 23 in the web 19. Each stud 29 has a head 30 adapted to engage a corresponding head 24 on the stud 23 to lock the ring tightly against the web 19. The cut-away portion 22 is preferably long enough to provide a recess so that the heads 30 can be dropped into it at the sides of heads 24, and then upon rotating the ring 25 said heads 30 will be brought into engagement with the heads 24 to form a sort of bayonet joint to lock the ring tightly against said web 19 and hold the sections 10 to 13, inclusive, in annular form. Thus, the dowel pins and the ring form a locking means for holding the device in rigid annular form.

My improved locking means may be easily applied to a form of sectional cores now in general use. This embodiment is indicated in Figs. 6 to 8, inclusive. In this form of device the web 19 has two laterally extending annular ribs 31 thereon, one of the ribs 31 being adapted to engage a recess 32 in the ring 33. Portions of the web 19 may be cut away as at 34, see Fig. 7, for facilitating connecting the headed studs or bolts for locking the ring to the web 19. In this construction the stud 23 is set so that its head 24 extends down adjacent the cut-away portion 34. The studs 29 are preferably extended radially in the ring 33, as clearly indicated in Fig. 6, so that their heads 30 can engage the heads 24 to lock the ring in position to hold the sections in annular form. It will be apparent that the dowel pin arrangement above referred to may be utilized in the form shown in Figs. 6 to 8, inclusive, for holding the sections in alinement.

In assembling the device, section 11 may first be placed in position, and then sections 10 and 12 placed in position at the ends of section 11. Section 13 is then moved upwardly from a position between the sections 10 and 12 permitting the dowels 16 to slide in the grooves 17 to bring said section 13 into position. The ring 25 is then placed on the web 19 with the heads 30 in the cut-away portions 22. The ring is then rotated to bring the heads 30 in engagement with the heads 24. This rotation of the ring may be accomplished in any desirable manner. I have provided openings 35 and 36 in adjacent portions of web 19 and ring 25 so that a suitable spanner wrench, not shown, may be applied to the openings to facilitate rotating the ring. Any suitable locking means may be provided to prevent rotation of the ring 25 with respect to the web. In Fig. 1 I have indicated a set screw 37 threaded in the ring 25 in a position to engage the inner periphery of web 19 to lock the ring against rotation. In Fig. 5 I have indicated a pin 38 mounted in flange 19 and pressed into a recess 39 in ring 25 by a spring 40. With such a construction the ring 25 would be rotated on the flange 19 until the pin 38 slipped into the opening 39 when the ring would be held against rotation. When it is desired to disassemble the device, the wrench placed in opening 36 would press the pin 38 down out of opening 39 and permit the ring to be rotated. It will be apparent that either of these forms of locks may be provided for the ring, or both forms may be used, if so desired.

I claim:

1. A tire core comprising a plurality of arc-shaped core sections; a ring engaging said core sections; and headed studs fixed in the ring and arc-shaped sections with the heads of the studs in the ring engaging the heads of the studs on said sections locking said sections to said ring.

2. A tire core comprising a plurality of arc-shaped core sections; a ring engaging said core sections with a groove in the ring adjacent said core sections; headed studs on said core sections with the heads of said studs extending into the groove of said ring; and headed studs on the ring with the heads of said studs disposed in said groove and engaging the heads of the studs on said sections locking said sections to said ring.

3. A tire core comprising a plurality of arc-shaped sections, a ring engaging said core sections; connecting means on said ring and core sections adapted to lock the latter to said ring upon relative rotary movements of the ring and core sections; and a spring-pressed pin and cooperating recess construction between the ring and one of the arc-shaped sections for automatically locking said ring against relative rotary movements on said sections.

4. A tire core comprising a plurality of arc-shaped sections having an annular groove therein; a ring having a groove concentric with the groove in said core sections; and locking means in said grooves adapted to lock the ring and core sections together upon limited rotary movement of the ring with respect to the core sections.

5. A tire core comprising a plurality of core sections having an annular groove therein; a ring having a groove concentric with the groove of said core sections; projections on the core sections extending into the groove in the latter; and projections on the ring extending into the recess in said ring and engaging the projections on the core sections to lock the latter to said ring.

6. A tire core comprising a plurality of core sections having an annular groove therein; a ring having a groove concentric with the groove of said core sections; projections on the core sections extending into the groove in the latter; projections on the ring extending into the recess in said ring and engaging the projections on the core sections to lock the latter to said ring; and a lock for automatically locking the core sections and ring together when brought into operative condition.

7. A tire core comprising a plurality of arc-shaped sections having an annular groove therein; a ring having a groove concentric with the groove of said core sections; means for locking the ring and core sections against lateral movements of the ring with respect to the core sections; and a spring pressed pin and recess locking the ring against relative rotary movements with respect to the core sections.

8. A tire core comprising a plurality of arc-shaped core sections; dowel pin connections between adjacent ends of said core sections; a ring engaging all of said sections; bayonet joint connections locking the ring against lateral movement away from said core sections; and a lock for locking the ring against relative rotary movement with respect to the core sections.

In testimony whereof I have signed my name to this specification on this 4th day of February A. D. 1922.

VICTOR H. HURT.